United States Patent [19]

Van Drie

[11] 3,923,169
[45] Dec. 2, 1975

[54] APPARATUS FOR COLLECTING SOLID-WASTE MATERIAL

[76] Inventor: Gerhardt Van Drie, 724 West Pine Ave., El Segundo, Calif. 90245

[22] Filed: Jan. 9, 1975

[21] Appl. No.: 539,630

Related U.S. Application Data

[63] Continuation-in-part of Ser. No. 359,074, May 10, 1973, abandoned.

[52] U.S. Cl. ............... 214/42 R; 198/7 BL; 198/9; 198/167; 198/229
[51] Int. Cl.² ......................................... B65G 15/14
[58] Field of Search ....... 214/42 R, 42 A; 198/7 BL, 198/9, 167, 229

[56] References Cited
UNITED STATES PATENTS

| | | | |
|---|---|---|---|
| 2,586,324 | 2/1952 | Graves | 214/42 X |
| 2,945,581 | 7/1960 | Clendenin | 198/229 |
| 3,521,734 | 7/1970 | Kerber | 198/9 |
| 3,587,814 | 6/1971 | Garabedian | 198/7 BL |
| 3,734,318 | 5/1973 | Kraus | 198/7 BL X |

*Primary Examiner*—Robert G. Sheridan
*Attorney, Agent, or Firm*—Francis X. LoJacono, Sr.

[57] ABSTRACT

An apparatus for collecting solid-waste material, said apparatus being adapted to be used in conjunction with a moving collection vehicle, and said apparatus comprising a front pick-up means adapted to pick up waste material encapsulated within paper or plastic bag containers, without tearing said containers – thereafter transporting the containers to the collection vehicle by means of a pair of oppositely-disposed, endless-belt conveyors, the loading means and conveyors being operable together by a self-contained power means interconnected by various drive means.

13 Claims, 11 Drawing Figures

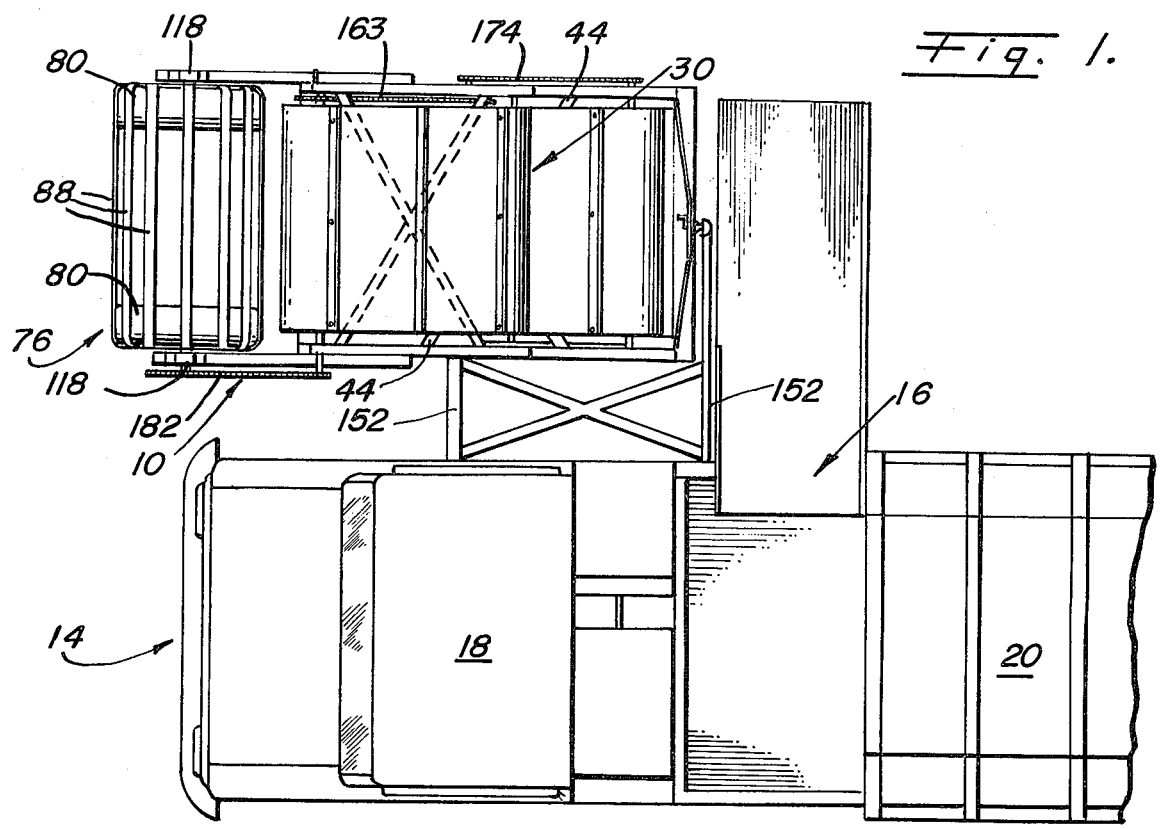
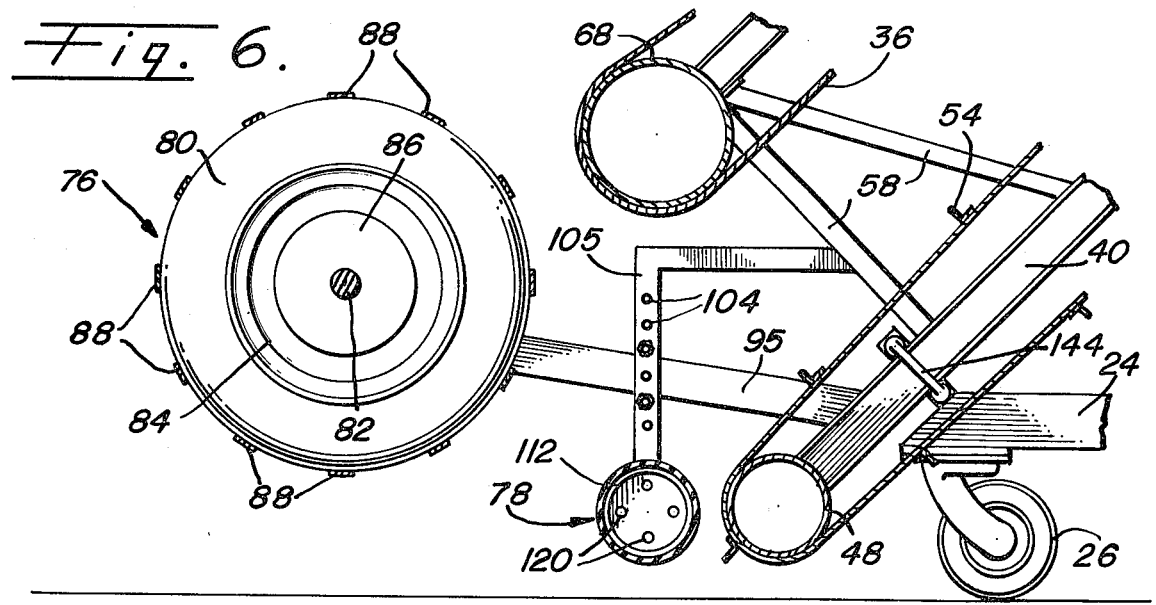
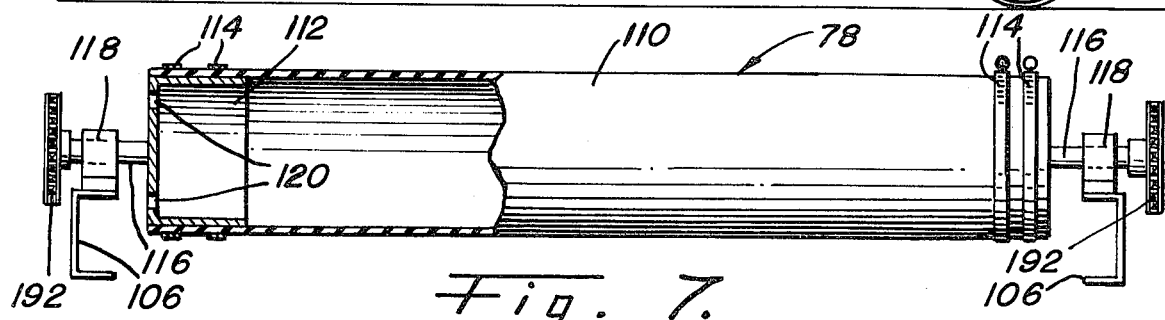

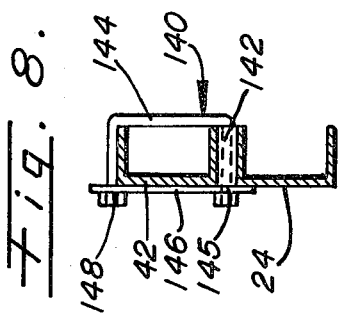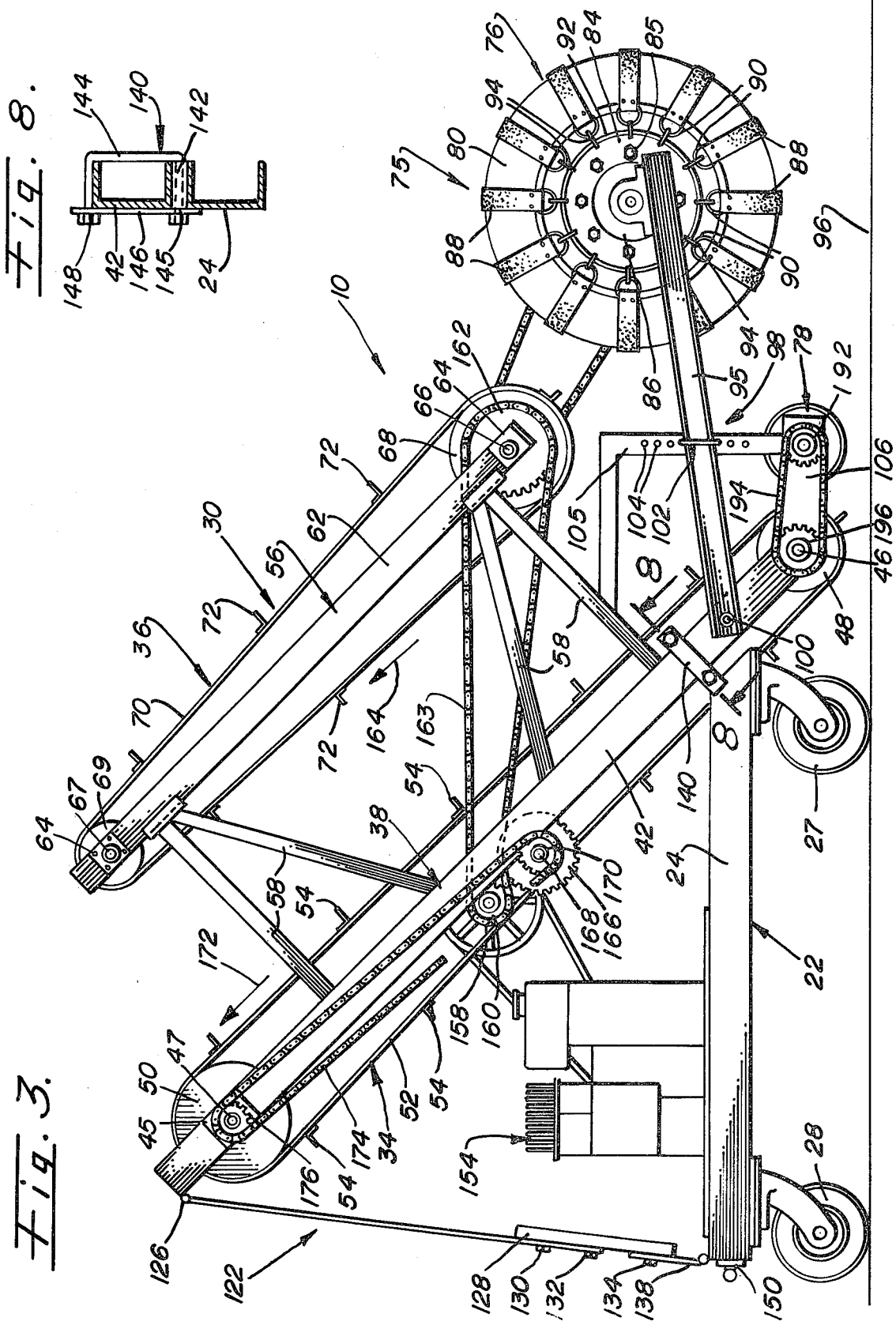

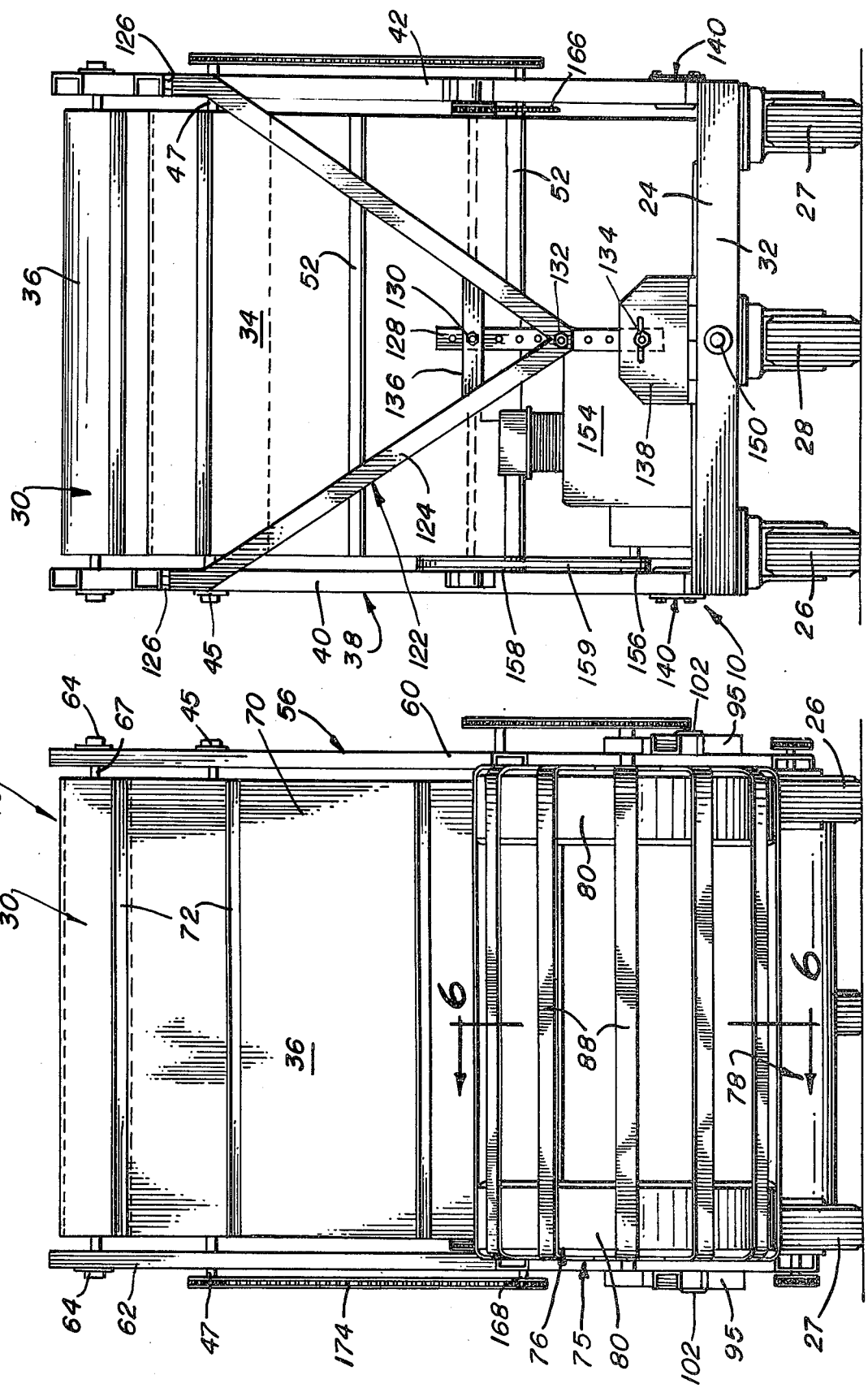

APPARATUS FOR COLLECTING SOLID-WASTE MATERIAL

CROSS REFERENCE TO RELATED APPLICATION

This application is a continuation-in-part of application Ser. No. 359,074, filed May 10, 1973, now abandoned.

BACKGROUND

1. Field of the Invention.

This invention relates generally to an apparatus for collecting solid waste materials and, more particularly, to an apparatus for collecting solid-waste materials encapsulated within plastic bag containers.

2. Description of the Prior Art.

There are various types of material-handling-and-collecting apparatuses in use today. Prior to recent times, these have been adequate in responding to most problems encountered in collecting trash and garbage along the streets and roadways of cities. However, due to advancement in technology, cost in manpower and, most important, the problems of environmental and pollution control, new requirements are now being generated.

The case in point with respect to the present invention is that ordinances of many cities at present require all trash and garbage to be disposed, enclosed and tied within plastic bags. Thus, a major problem has arisen with this advancement in solid-waste disposal collecting — picking up the solid waste without splitting the plastic bags open when transferring them to a collection vehicle. It has been noted that, very often, some of the trash ends up on the streets and not in the vehicle. Thus, time is required for cleaning up such debris, and additional manpower is often needed, creating a greater expense — not to mention the unwanted residue left behind to pollute the surrounding areas.

Because of the above-mentioned problems relating to the use of plastic bag containers for solid waste, they might tend to discourage the use of such bags by many persons and create a standstill in the advancement of controlling pollution at a time such control should be furthered.

The applicant is not aware of any mechanized device or collecting apparatus that is capable of being used as a quick, easy, safe and economical means for collecting solid-waste material disposed within plastic bags. Therefore, the applicant provides in the invention as disclosed the necessary capabilities to solve the existing problems as mentioned above.

SUMMARY

The present invention discloses an apparatus for collecting and handling solid waste material by which the solid-waste materials are collected and transported from the apron portions of streets and highways, the waste materials being disposed and encapsulated within plastic bags. The apparatus includes means whereby it can be operably attached to various roadside maintenance vehicles, such as trucks and tractors. The collection apparatus comprises a wheel-supported main carriage with connecting means adapted thereto whereby the overall apparatus can be removably attached to a vehicle, the carriage being provided with a plurality of support wheels or casters that allow the apparatus to be mobile along with the vehicle to which it is attached.

A conveyor support means is adjustably mounted to the carriage in such a manner that the forward end thereof is positioned just above the roadbed and extended upwardly and rearwardly to an elevated point. The conveyor support means includes a pair of frame members, one above the other, in parallel relationship to each other, wherein the lower frame member is also adapted with a conveyor belt, each being operably synchronized in a rearwardly direction so that any waste material interposed between the adjacent oppositely-disposed belts of the conveyors is transported to the upper, elevated, rear-discharge point at the rear end of the carriage.

However, in order to provide for the necessary loading of the solid-waste material when enclosed in plastic bags, there is adjustably mounted in the lower, forward end of the lower frame member a loading pick-up means which gently picks up and feeds each filled bag between the rotating endless-belt conveyors. The loading pick-up means, together with the endless-belt conveyors, are driven by a single power means synchronously interconnected by various chain-and-belt drives.

The collection apparatus will be generally attached to the side of a trash-type vehicle which will be suitable for various street or highway conditions. As an example, however, the apparatus is so attached as to move forward with the vehicle at an approximate rate of 5 miles per hour, the collection device being juxtaposed along the street curb whereby an operator may walk along with the complete moving unit, placing the filled bags in a position on the street surface; or, residents may place the bags at designated or marked locations adjacent to the curb, whereby the forward-moving apparatus automatically picks up the bags, one by one, and feeds them into the conveyor system, as previously described.

OBJECTS AND ADVANTAGES

The present invention has for an important object the provision for a solid-waste-collecting-and-handling apparatus that includes a simple but positive loading means, whereby solid waste encapsulated within plastic bags can be picked up and disposed in a collection vehicle without damage to the plastic bags and loss of the waste material.

It is another object of the invention to provide a solid-waste-material-collecting apparatus that is capable of being combined and operated in conjunction with various roadside maintenance vehicles such as trucks, tractors and the like.

It is still another object of the invention to provide a trash-and-garbage-collecting apparatus that is relatively inexpensive to operate.

A further object of the invention is to provide an apparatus of this character that is simple and rugged in construction, and easy to operate.

A still further object of the invention is to provide a collecting apparatus of this character that comprises a minimum of parts and members, and is relatively inexpensive to manufacture.

Another object of the invention is to provide a collecting-and-handling apparatus that is particularly designed to handle solid-waste material that is contained in plastic bags, whereby the bags are picked up automatically as they are positioned adjacent the curb or apron of the street or roadway.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only;

FIG. 1 is a top plan view of the apparatus shown operably connected to one type of a trash-collecting vehicle;

FIG. 3 is a side-elevational view illustrating the side opposite that shown in FIG. 2;

FIG. 4 is a front-elevational view thereof;

FIG. 5 is a rear-elevational view thereof;

FIG. 6 is an enlarged, fragmental, cross-sectional view taken along line 6—6 of FIG. 4 thereof;

FIG. 7 is a plan view of the second pickup roller, with a portion thereof broken away;

FIG. 8 is an enlarged sectional view taken along line 8—8 of FIG. 3.

DESCRIPTION OF THE PREFERRED EMBODIMENT

Figure 2:
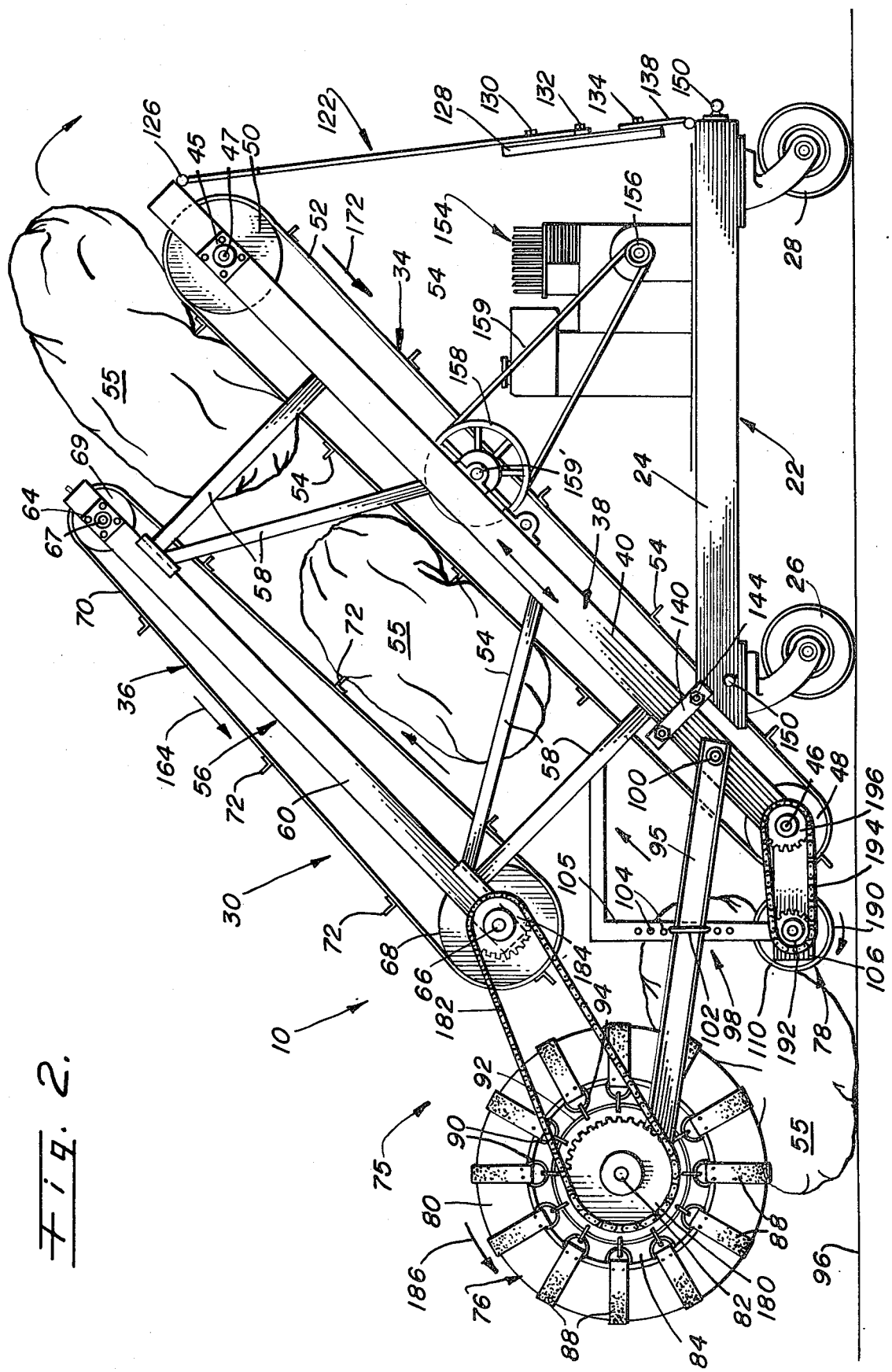
FIG. 2 is a side-elevational view of the apparatus.

Referring to the drawings and more particularly to FIG. 1, there is illustrated a solid-waste-collecting apparatus, generally indicated by reference character 10, operably attached by a connecting means 12 to a roadside maintenance vehicle, indicated generally at 14, said vehicle being illustrated as a trash and/or garbage collection truck. For illustrative purposes, this truck 14 is provided with a trash-receiving means 16 disposed intermediate the cab 18 of the truck and the main trash-storage body section 20. As previously mentioned, there are various suitable waste-collecting vehicles of known design which can be used, the above being illustrated for ease in understanding the complete operation thereof.

The solid-waste-collecting-and-handling apparatus comprises a wheel-supported undercarriage, generally indicated at 22, which includes a somewhat rectangular frame member 24 movably supported from the ground surface by transporting means which includes a plurality of wheels or casters 26, 27 and 28, respectively. In order to provide a more controlled movement of the overall apparatus, as well as means to prevent warping of the conveyor system, generally indicated at 30, the three casters are so disposed under the carriage to act as a trisuspension system, wherein said rotatable casters 26 and 27 are oppositely disposed and secured to the opposite, forward corners of the frame member 24, with the third caster 28 being centrally positioned and secured to the rear-structure member 32 of the frame 24. Thus, said apparatus 10 can easily accommodate itself to various contours of the roadbed when traveling along with the vehicle 14.

Adjustably mounted to said undercarriage 22 and superposed thereto is the conveyor system, generally indicated by numeral 30, said conveyor means comprising a lower conveyor means 34 and an upper conveyor means 36, which are disposed generally parallel in relationship to each other. Accordingly, each conveyor means is provided with its own frame structure. The first of said frame structures is referred to as the lower frame structure 38 which is adapted to operably support said lower conveyor means 34. The frame structure 38 includes two oppositely-disposed, side-channel members 40 and 42, which are in a fixed parallel condition in relation to each other by truss members 44. Mounted to each free end of each channel member 40 and 42 is a support bearing 45 adapted to have shafts 46 and 47 of each oppositely-disposed conveyor drum 48 and 50, respectively, journaled therein. Disposed about each drum 48 and 50 is an endless belt 52. Cross ribs 54 are equally spaced longitudinally along the belt 52 and traverse the width thereof, to provide a means for carrying the solid-waste package 55 along with the moving belt.

Similarly, the upper conveyor means 36 includes a second frame structure 56, referred to as the upper frame structure which is fixedly positioned above said first or lower frame structure 38 by struts 58. Said upper frame structure also includes parallel-spaced, side-channel members 60 and 62, respectively. The free ends of the members 60 and 62 are provided with an adjustable bearing 64 in which shafts 66 and 67 are respectively journaled. Conveyor drums 68 and 69 are supported by said shafts and rotate therewith. An endless belt 70 is disposed about the drums in a normal manner, having rib members 72 affixed to the belt in any suitable manner and evenly spaced apart, as seen in FIGS. 2 and 3.

To provide the necessary loading of the solid-waste material that is enclosed in the plastic bags 55, there is adjustably mounted to the lower, forward end of the lower frame member 38 a loading pick-up means, indicated generally at 75. Said means provides for the fast but gentle pick-up of each bag 55 and feeds each filled bag between the rotating endless belts 52 and 70 of each respective conveyor means.

The loading pick-up means comprises a first pick-up roller and a second pick-up roller or drum, both generally indicated by reference characters 76 and 78, respectively. Said first pick-up roller includes a pair of oppositely-disposed wheels or cylinders 80 which are removably attached to a drive axle 82 by means of a hub 84 and bolts 85, said bolts holding said hub 84 to an annular flange 86 affixed to said axle 82 so as to rotate therewith by means of a drive system which will be hereinafter described.

The wheels 80 are disposed adjacent each end of the axle 82, having a space therebetween at least equal to the width of said endless belts. Traversing this defined space there is provided a plurality of flexible pick-up straps 88 (FIG. 4). These straps are equally disposed about the wheels 80, whereby defining a somewhat drum-like configuration, forming said first pick-up roller 76. It should be noted that it is contemplated that said straps will be formed from any suitable flexible material, particularly a rubber-base material. However, other materials such as various plastics, nylons, fabrics, and in some cases metals may be used. For illustrative purposes, the straps are shown as flat, elongated, flexible bands stretched from the oppositely-disposed wheels 80. In addition, however, they can be tubular or circular in shape and still provide the required pick-up necessary for the loaded bags. Means are also provided for removably securing the straps to the roller and this means includes eyelets 90 attached at each free end of the straps which are thereby coupled to an attaching ring 92 by means of hooks 94. Thus, it can be readily seen that said straps can be easily replaced when necessary, without any breakdown with respect to the apparatus.

The complete pick-up roller 76, as defined, is operably mounted to extended arms 95 which are pivotally connected to the lower portion of frame 38 and held in a predetermined position relative to the ground surface 96 by an adjustable mounting means, generally indicated at 98. Said adjustable mounting means comprises a pivot 100, located at the rear end of arms 95, and a demountable clamp 102, said clamp being adjustable upwardly or downwardly by use of a plurality of holes 104 disposed in an upright support bar 105 affixed to a portion of said frame 38.

The second pick-up roller or drum 78 is positioned at the lower end of frame 38 and operably mounted to extended leg members 106. Hence, the drum 78 is disposed just above the ground surface 96, and to the rear and below said first roller 76, but juxtaposed to drum 48 of the conveyor 34. The second pick-up roller comprises a flexible, elongated, tubular body 110 having a general length approximately the width of the adjacent endless conveyor belt 52, said tubular body 110 being mounted by hubs 112 which are received in the open end thereof and clamped thereon by clamps 114. Each hub has an integral shaft 116 affixed thereto, with said shaft ends journaled in bearings 118, the bearings being supported on leg members 106. Disposed within the face of each hub is a plurality of apertures 120 to provide air holes for release of air captured within the tubular body when said body is deformed during contact with a bag 55. However, it should be understood that various modes of flexible rollers could be substituted therefor and provide the required effect.

As previously described, the conveyor system 30 is supported by the undercarriage 22; and there is, in addition, an adjusting means whereby the conveyors can be adjusted either with respect to the angle of the conveyors to the horizontal plane of the carriage or to the distance the second roller means is disposed over the ground surface. The adjusting means comprises a skeleton structure 122 having a yoke member 124 pivotally connected at 126 to the upper end of frame 38, with the closed end of the yoke bolted to a vertical support bar 128, said bar being adapted with a plurality of holes to accommodate bolts 130, 132, and 134, respectively. Bolt 130 holds brace member 136 in fixed relation to bar 128, providing a more rigid connection between the yoke and the bar 128, with the additional bolt 132 disposed therein. Bolt 134, however, is the connecting means between adjusting bar 128 and pivotal plate 138, said plate being pivotally secured to said member 32 of the undercarriage 22. The yoke can be adjusted along the bar 128 when required. It should also be mentioned that such an arrangement as described herewith provides, in addition, a means for adjusting the conveyor frame to effectuate belt tracking.

Included within the adjusting means are pivotal assemblies 140 for connecting and supporting the conveyor system 30. These assemblies 140 are disposed at the forward end of the undercarriage 22 by a sleeve 142 welded to frame 24, said sleeve having a portion of a U bolt 144 pass therethrough and held therein by nut 145. Passing through the U bolt and engaged therein are frame members 40 and 42, as seen in FIG. 8, said frame member being held in place by plate 146 when both nuts 145 and 148 are tightened. Thus, a three-point support system from the undercarriage to the conveyor system is provided to prevent warping thereof, which could cause improper belt tracking.

Figure 9:
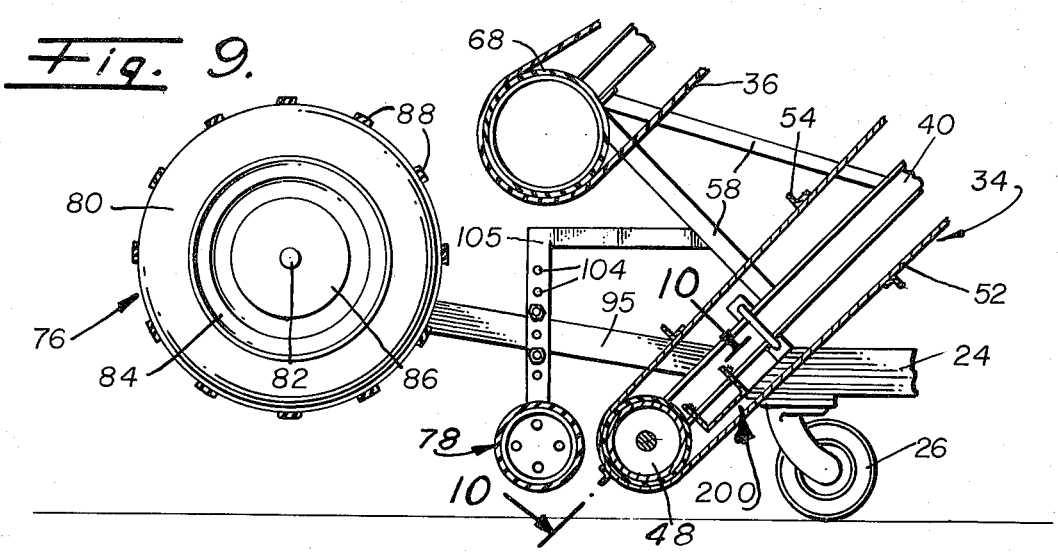
FIG. 9 is an enlarged, fragmental, cross-sectional view similar to FIG. 6, wherein a receptacle means is disposed within the lower conveyor means.
Figure 10:
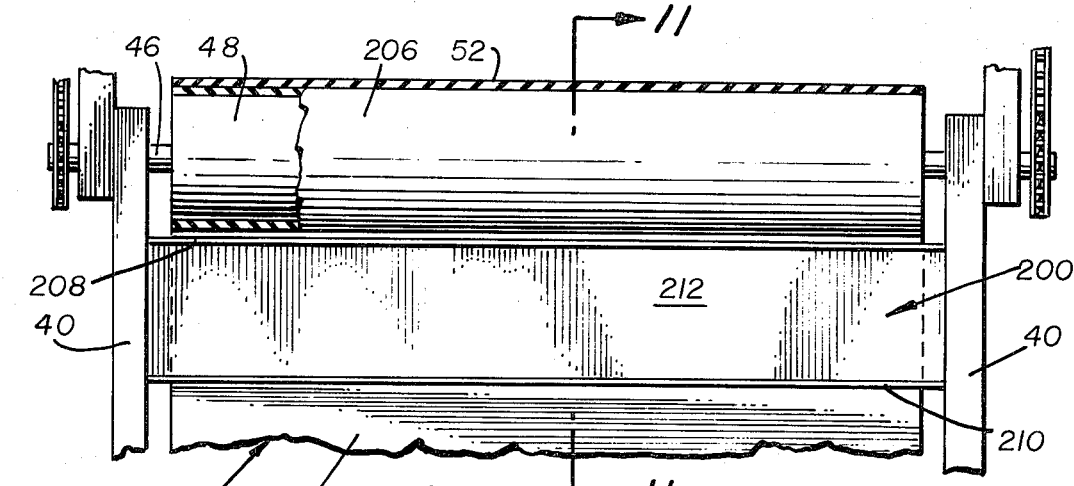
FIG. 10 is an enlarged cross-sectional view taken substantially along line 10—10 of FIG. 9.
Figure 11:
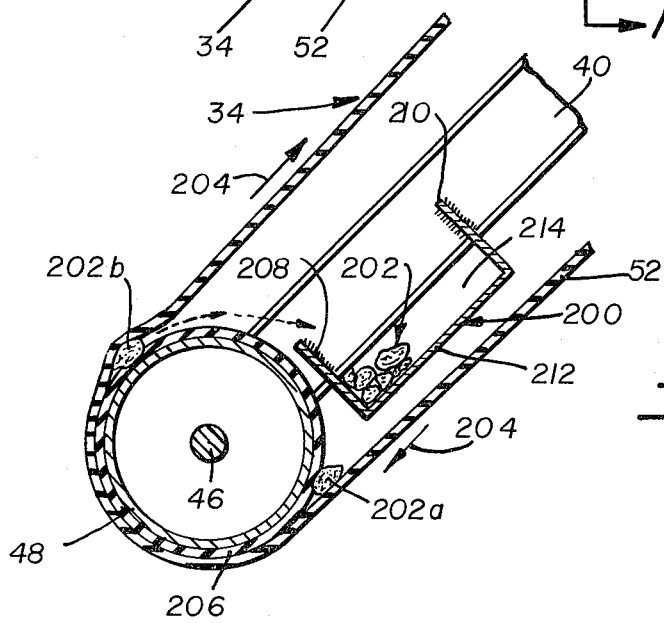
FIG. 11 is a cross-sectional view taken substantially along line 11—11 of FIG. 10, wherein various debris is shown therein.

Referring now to FIGS. 9, 10 and 11, there is shown a receptacle means, generally indicated at 200. It has been found that, during the operation of the waste-collecting apparatus, occasionally debris such as rocks, glass, sticks, etc., generally indicated at 202, will fall between the lower conveyor-belt system 34 and be caught by the belt 52. As the conveyor belt 52 moves in the direction of arrows 204, (see FIG. 11.) debris 202, such as represented by rock 202a, is wedged between roller 48 and belt 52, and transported therebetween until said rock reaches a point shown as rock 202b, at which time the rock is projected outwardly therefrom. Hence, receptacle means 200 is fixedly disposed adjacent the roller 48 in parallel relation thereto and transverse to said belt 52, in order to capture the debris within the receptacle means, as said debris is projected off the roller 48.

Thus, it can be understood that, if the debris were allowed to continuously revolve with the belt and the roller, great damage would occur. The belt 52 is made from a suitable rubber material, and the roller 48 is also provided with a peripheral rubber cover 206. Accordingly, rocks, broken glass, and like destructive materials, will readily damage the rubber materials by ripping and slicing them, if such a receptacle means to collect the debris were not provided.

The receptacle comprises an elongated channel defined by upright side walls 208 and 210, with a bottom wall 212 integrally formed therewith. The side walls are fixedly attached to the oppositely-positioned, frame members 40 and are generally welded thereto, as shown in FIG. 11. Said vertical wall 208 is juxtapositioned to within one-quarter of an inch from the roller cover, thus insuring that the debris therefrom is readily received within the channel. However, the lower bottom wall 212 is positioned approximately one inch above the lower portion of belt 52. Due to the flexibility of the conveyor belt, it will undulate as it operates; therefore, adequate space is required between wall 212 and belt 52 to prevent damage thereto — this space, then, allowing the smaller-sized debris to reach the roller.

The channel 200 is provided with oppositely-disposed, open, free ends 214 which extend outwardly beyond the width of the belt 52. (See FIG. 10) As the debris is accumulated within the receptacle means 200, the operator thereof will periodically clear said debris therefrom through the free open ends 214.

It should be noted at this time that the rubber cover 206 provides a two-fold advantage — a positive traction between the roller 48 and the belt 52, and the elimination of noise pollution while the apparatus is in operation.

OPERATION

After the material-collecting-and-handling apparatus is operably secured by an attaching means, which includes ball joints 150 mounted to the undercarriage 22 and connecting arms 152 extending from the trash collection truck 14, the power drive, generally indicated at 154, is started. The power drive is shown as a gasoline-driven engine mounted to the undercarriage, the controls of which are not shown but can be disposed either directly on the apparatus or extended for operation and control within the cab of the vehicle 14. As the truck is moved along the roadway at an approximate rate of five miles per hour, the engine 154 is started at a rate equal to the truck's speed. Affixed to the engine output shaft is a drive pulley 156 interconnected to an enlarged drive pulley 158 by belt 159 (FIG. 2), said pulley 158 being mounted to one end of a traverse shaft 159'. The opposite, free end of shaft 159' is adapted with a drive gear 160 (FIG. 3) which is, in turn, operably connected to an enlarged gear 162 by chain 163, said gear 162 being fixedly mounted to shaft 66 of conveyor drum 68. Thus, the upper conveyor has the drive means so connected as to cause the conveyor belt 70 to rotate in the direction of arrow 164.

To provide the movement for the lower belt system 34, there is included a chain-engaging gear 166 mounted to shaft 168, which is disposed adjacent and parallel to shaft 159', whereby gear 166 operably engages chain 163, thus rotating shaft 168. Said shaft 168 also has a second, smaller gear 170 mounted thereon to operate the belt 52 in the direction of arrow 172, by chain 174 interconnected to gear 176 which is fixedly mounted to said shaft 47 of belt drum 50.

Thus, when motor 154 is operative, both conveyor means 34 and 36 are thereby imparted with movement to the directions as indicated in FIGS. 2 and 3. Hence, bags 55 are readily transported upwardly and rearwardly once said bags are received therebetween.

Accordingly, the loading pick-up means is provided with a synchronized rotating movement relative to that of the conveyor belts; and this is accomplished through chain drives. The first pick-up roller 76 is provided with an enlarged gear 180 driven through chain 182 by gear 184, said gear 184 being mounted to shaft 66, thus rotating therewith and causing said roller pick-up 76 to rotate in the direction of arrow 186.

As can be seen in FIG. 2, as the unit moves forward and roller 76 passes over a bag 55, the bag is caused to be fed onto the second pick-up feeding roller 78, which in turn rotates in the direction of arrow 190 by means of gear 192 which is operably affixed thereto and driven by chain 194 through gear 196, said gear 196 being mounted to shaft 46 of conveyor drum 48.

The invention and its attendant advantages will be understood from the foregoing description, and it will be apparent that various changes may be made in the form, construction and arrangement of the parts of the invention without departing from the spirit and scope thereof, or sacrificing its material advantages, the arrangements hereinbefore described being merely by way of example; and I do not wish to be restricted to the specific forms shown or uses mentioned, except as defined in the accompanying claims.

I claim:

1. A solid-waste-material-handling-and-collecting apparatus, wherein said solid waste-material is encapsulated within a plastic bag and said apparatus is adapted to be used in combination with a collection vehicle, said apparatus comprising:
   an undercarriage;
   means secured to said undercarriage for movably supporting said carriage;
   a conveyor system adjustably mounted to said undercarriage wherein the forward end of said conveyor system is inclined downwardly in close proximity to the road surfae thereon, forming a material-receiving end;
   a loading pick-up means adjustably mounted to said conveyor system and disposed adjacent said material-receiving end of said conveyor system; wherein said loading pick-up means comprises:
   a first pick-up roller adjustably mounted to said conveyor system and positioned forward therof for flexible engagement with said encapsulated waste material, wherein said first pick-up roller comprises:
   a pair of cylinders, spaced apart;
   a drive axle having said cylinders removably mounted adjacent each end thereof for rotation therewith;
   a plurality of flexible straps disposed between said cylinders, thereby forming a flexible roller;
   means for removably securing said straps to said cylinders; and
   an adjustable mounting means for mounting said first pick-up roller to said conveyor system forward thereof; and
   a second pick-up roller mounted to the lower receiving end of said conveyor system and adjustable therewith, to provide the proper space between said second roller and the road surface when traversing thereover;
   a power drive operably connected to said conveyor system and said loading pick-up means; and
   means for removably attaching said apparatus to said collection vehicle, whereby said apparatus is towed by said vehicle.

2. A material-handling-and-collecting apparatus as recited in claim 1, including a drive means operably interconnecting said first pick-up roller to said power drive.

3. A material-handling-and-collecting apparatus as recited in claim 1, wherein said second pick-up roller comprises:
   an elongated, flexible, tubular body, the length thereof being substantially equal to the width of said conveyor system;
   a pair of hubs received in each end of said tubular body, said hubs having extended shafts journaled, for rotation with said apparatus.

4. A material-handling-and-collecting apparatus as recited in claim 3, including a drive means operably interconnecting said second pick-up roller to said power drive.

5. A material-handling-and-collecting apparatus as recited in claim 4, wherein said conveyor system comprises:
   a frame structure adjustably supported to said undercarriage;
   a lower conveyor means having a receiving end juxtaposed to said second pick-up roller, for receiving said waste-filled plastic bags and being operably mounted within said frame structure;

an upper conveyor means supported within said frame structure and superposed in a parallel relationship to said lower conveyor means, and wherein said lower and upper conveyor means are disposed at an upwardly-inclined angle to that of said undercarriage; and means for adjusting said lower and upper conveyor means with respect to said angle thereof, said adjusting means being secured between said frame structure and said undercarriage.

6. An apparatus as recited in claim 5, including a drive means operably interconnected between said upper and lower conveyor means, and between said lower conveyor means and said power drive.

7. An apparatus as recited in claim 6, wherein said means for adjusting said upper and lower conveyor means comprises:
 a pivot assembly disposed between said frame structure and said undercarriage at the forward end thereof;
 a yoke member movably attached to the rearward portion of said frame structure and depending therefrom;
 a pivot plate movably attached to said undercarriage; and
 a support bar interposed between said yoke and said pivot plate, whereby said yoke can be positioned thereon.

8. A material-handling-and-collecting apparatus as recited in claim 7, wherein said drive means of said first pick-up roller, said drive means of said second pick-up roller, and said drive means of said conveyor system are simultaneously interconnected to and operated by said power drive, and wherein each of said means are synchronized to provide the proper operating speed relative to the speed of said collection vehicle.

9. A material-handling-and-collecting apparatus as recited in claim 8, wherein said movable supporting means of said carriage comprises a tri-suspension system having a pair of oppositely-disposed, front caster wheels secured to the forward end of said frame structure, and a single caster wheel centrally disposed and secured to the rear of said frame structure.

10. A solid-waste-material-handling-and-collecting apparatus as recited in claim 1, wherein said apparatus also includes a receptacle means transversely disposed within said lower conveyor means whereby debris from said waste material is received therein.

11. A solid-waste-material-handling-and-collecting apparatus as recited in claim 10, wherein said receptacle means comprises a channel member having a pair of upright side walls and a bottom wall integrally formed therewith, and including oppositely-disposed, open, free ends, said channel member being positioned adjacent said receiving end of said lower conveyor means.

12. A solid-waste-material-handling-and-collecting apparatus, wherein said solid-waste material is encapsulated within a plastic bag and said apparatus is adapted to be used in combination with a collection vehicle, said apparatus comprising:
 an undercarriage;
 means secured to said undercarriage for movably supporting said carriage;
 a conveyor system adjustably mounted to said undercarriage wherein the forward end of said conveyor system is inclined downwardly in close proximity to the road surface thereon, forming a material-receiving end;
 a loading pick-up means adjustably mounted to said conveyor system and disposed adjacent said material-receiving end of said conveyor system, wherein said loading pick-up means comprises:
  a pick-up roller adjustably mounted to said conveyor system and positioned forward thereof for flexible engagement with said encapsulated waste material, wherein said pick-up roller comprises:
   a pair of cylinders, spaced apart;
   a drive axle having said cylinders removably mounted adjacent each end thereof for rotation therewith;
   a plurality of flexible straps disposed between said cylinders, thereby forming a flexible roller;
   means for removably securing said straps to said cylinders; and
  an adjustable mounting means for mounting said pick-up roller to said conveyor system forward thereof;
 a power drive operably connected to said conveyor system and said loading pick-up means; and
 means for removably attaching said apparatus to said collection vehicle, whereby said apparatus is towed by said vehicle.

13. A solid-waste-material-handling-and-collecting apparatus as recited in claim 12, wherein said apparatus also includes a receptacle means transversely disposed within said conveyor system adjacent said forward end thereof.

* * * * *